(12) United States Patent
Hofschulte et al.

(10) Patent No.: US 7,131,695 B2
(45) Date of Patent: Nov. 7, 2006

(54) VEHICLE SEAT SECTION ADJUSTING DEVICE

(75) Inventors: Wolfram H. Hofschulte, Bonndorf (DE); Andreas Margrander, Germersheim (DE); Sven Ritter, München (DE); Rudolf Rackl, München (DE); Stefan Feulner, Pfaffenhofen (DE)

(73) Assignee: IMS Gear GmbH, Donaueschingen (DE)

( * ) Notice: Subject to any disclaimer, the term of this patent is extended or adjusted under 35 U.S.C. 154(b) by 0 days.

(21) Appl. No.: 10/885,485

(22) Filed: Jul. 6, 2004

(65) Prior Publication Data

US 2005/0046253 A1    Mar. 3, 2005

(30) Foreign Application Priority Data

Jul. 3, 2003    (DE)    ............... 103 30 028

(51) Int. Cl.
A47C 7/14    (2006.01)
(52) U.S. Cl. ............... 297/284.9; 297/284.3; 297/284.11
(58) Field of Classification Search ............ 297/284.9, 297/284.11, 284.3
See application file for complete search history.

(56) References Cited

U.S. PATENT DOCUMENTS

| | | | | |
|---|---|---|---|---|
| 3,773,382 A * | 11/1973 | Coursault et al. | ......... | 297/284.9 |
| 4,370,000 A * | 1/1983 | Kazaoka et al. | ......... | 297/284.9 |
| 4,455,047 A * | 6/1984 | Watanabe | ................ | 297/284.9 |
| 4,500,136 A * | 2/1985 | Murphy et al. | .......... | 297/284.9 |
| 4,536,030 A * | 8/1985 | Sakurada et al. | ........ | 297/284.9 |
| 4,537,444 A * | 8/1985 | Maruyama et al. | ...... | 297/284.9 |
| 4,636,000 A * | 1/1987 | Nishino | ................... | 297/284.9 |
| 4,655,505 A | 4/1987 | Kashiwamura et al. | ..... | 297/284 |
| 4,679,855 A * | 7/1987 | Hattori et al. | ....... | 297/284.9 X |
| 4,697,848 A * | 10/1987 | Hattori et al. | ....... | 297/284.9 X |
| 4,804,221 A * | 2/1989 | Saiki | ....................... | 297/284.9 |
| 4,885,513 A * | 12/1989 | Sakamoto et al. | ....... | 297/284.9 |
| 4,913,491 A * | 4/1990 | Mizuno et al. | .......... | 297/284.9 |
| 4,924,162 A | 5/1990 | Sakamoto et al. | .......... | 318/569 |
| 4,924,163 A * | 5/1990 | Sakamoto et al. | ... | 297/284.9 X |
| 5,171,062 A * | 12/1992 | Courtois | ............ | 297/284.11 X |
| 5,328,236 A * | 7/1994 | Mizushima et al. | ..... | 297/284.9 |
| 5,425,569 A * | 6/1995 | Hayes | ................ | 297/284.9 X |
| 5,588,708 A * | 12/1996 | Rykken et al. | ....... | 297/284.11 X |
| 5,857,743 A | 1/1999 | Ligon, Sr. et al. | ....... | 297/284.9 |
| 5,975,633 A * | 11/1999 | Walk et al. | .............. | 297/284.9 |
| 6,037,731 A | 3/2000 | Fruehauf et al. | ............ | 318/468 |
| 6,068,336 A * | 5/2000 | Schonauer | ............... | 297/284.9 |
| 6,203,106 B1 * | 3/2001 | Nearing et al. | ...... | 297/284.9 X |
| 6,578,916 B1 | 6/2003 | Longhi et al. | ........... | 297/284.3 |
| 6,616,229 B1 * | 9/2003 | Kuster et al. | ............ | 297/284.9 |
| 6,672,666 B1 * | 1/2004 | Stiller et al. | ......... | 297/284.9 X |
| 2004/0140705 A1 * | 7/2004 | McMillen et al. | ... | 297/284.9 X |
| 2004/0245826 A1 * | 12/2004 | Santamaria | ............... | 297/284.9 |

FOREIGN PATENT DOCUMENTS

| | | | |
|---|---|---|---|
| DE | 3626181 A1 * | 2/1988 | ............. 297/284.9 |
| DE | 19605779 | 7/1996 | |
| DE | 19737271 | 5/1999 | |
| DE | 10219015 | 11/2003 | |
| FR | 2768092 | 3/1999 | |

\* cited by examiner

*Primary Examiner*—Rodney B. White
(74) *Attorney, Agent, or Firm*—O'Shea, Getz & Kosakowski, P.C.

(57) ABSTRACT

A vehicle seat section adjusting device includes a seat section adjusting element for adjusting the width of a seat section. The adjusting device includes a mounting mechanism for movably supporting the seat section adjusting element on the seat, and a drivable adjusting mechanism for adjusting the seat section adjusting element from or to a rest position relative to the mounting mechanism.

8 Claims, 4 Drawing Sheets

VEHICLE SEAT SECTION ADJUSTING DEVICE

BACKGROUND OF THE INVENTION

The invention relates to a vehicle seat section adjusting devices.

Seats installed in vehicles, in particular luxury automobiles, have a vehicle seat section adjusting device so that the seat section width of the backrest and/or of the side bolster, can be adjusted. The adjustment of the backrest width and of the side bolster serves both as a comfort setting and also, in connection with an active, individualized intervention, enhances lateral support and thus the driving safety associated therewith.

A known vehicle seat section adjusting device has a back adjusting element or a seat section adjusting element for adjusting the width of a back section of a seat in an adjustment direction, a mounting mechanism for movably supporting the seat section adjusting element on the seat, and a drivable adjusting mechanism for adjusting the back adjusting element out of or into a rest position relative to the mounting mechanism. The back width is adjusted with a plastic wing as a back adjusting element, which plastic wing is supported in a guide and is actuated by a transmission via cables. This makes the construction very expensive and correspondingly results in high repair costs.

Therefore, there is a need for a vehicle seat section adjusting device that has a simplified construction, in particular has a small space requirement and number of components.

SUMMARY OF THE INVENTION

A vehicle seat section adjusting device having a seat section adjusting element for adjusting the width of a seat section of a seat in an adjustment direction, a mounting mechanism for movably supporting the seat section adjusting element on the seat, and a drivable adjusting mechanism for adjusting the seat section adjusting element out of or into a rest position relative to the mounting mechanism. Here a seat section is to be understood as meaning in particular the lateral region of the backrest, i.e., an adjustment option for the back width, as well as the lateral region of the seat surface, i.e., the side bolster of a seat. This concept can, however, be extended to other seat sections.

In a preferred approach according to a first exemplary embodiment, the seat section adjusting element is fashioned as an abutment running obliquely to its longitudinal direction and/or having an arc shape for the adjusting mechanism, and the adjusting mechanism for adjusting the seat section adjusting element is fashioned and arranged adjustably so that a portion of the adjusting mechanism moves along the abutment and in contact therewith.

According to a second exemplary embodiment, the seat section adjusting element is fashioned as an abutment for the adjusting mechanism and the adjusting mechanism has an outrigger element that extends laterally from the adjusting mechanism into a motion plane of the seat section adjusting mechanism, a section of the outrigger element being fashioned so as to move along the abutment and in contact therewith.

Together with the mechanical elements of the seat section adjusting device, the circuit arrangement has an electric motor drive for driving the adjusting mechanism, an acceleration sensor for determining an instantaneously effective and/or expected acceleration in the lateral direction of the seat, and a control unit for controlling the drive in such fashion that the seat section adjusting element momentarily enlarges the width of the seat section on the side of the seat that is directed opposite to the acceleration direction.

The seat section adjusting element is configured and arranged so that, in the region of the arc-shaped abutment, it increases in width in the direction toward a support point of the seat section adjusting element on the mounting mechanism. The seat section adjusting element may be fashioned as a side bolster for the forward or rearward motion of a back section.

The abutment may be fashioned on the side of the seat section adjusting element that lies opposite the side of the seat section adjusting element fashioned for the forward or reverse adjustment of a bolster element. The abutment of the seat section adjusting element may be concave in shape.

The abutment of the seat section adjusting element may be configured and arranged with a space between a pivot support of the seat section adjusting element and its support on the mounting mechanism.

The adjusting mechanism has a lever element with an outer section fashioned for motion in contact with the abutment. The seat section adjusting element and the lever element are supported spaced apart from one another and are arranged pivotably about their support points relative to a common plane.

The adjusting mechanism is movable in a direction oblique, in particular approximately perpendicular, to the adjustment direction of the width of the seat section.

The outrigger element has an outer circumference that is arc-shaped and at least partly convex in the motion plane and in particular is fashioned in the shape of a wheel.

In one of its positions, in particular the base positions, the spindle axis of the spindle drive extends in a longitudinal direction substantially parallel to the longitudinal alignment of the seat section adjusting element.

Thus the device is in particular one in which a non-co-rotating spindle abutment for the seat section adjusting element is supported on a spindle shaft, in particular on its free front end, the spindle abutment in one position, in particular the base position, extending substantially parallel to the seat section adjusting element, the part of the adjusting mechanism that moves in contact with the spindle abutment being arranged and moved between the abutment and the spindle abutment.

The device exhibits an arrangement of the individual elements in longitudinal extension each substantially parallel to one another when the adjusting device is in a selected position, in particular the base position.

The device has a hole or recess in the wall of the seat section adjusting element to accommodate individual element sections of the device in at least a base position.

An electric motor drive adjusts the adjusting mechanism and the seat section adjusting element.

An acceleration sensor senses a lateral acceleration and provides an acceleration signal to the control unit.

A steering motion sensing unit senses a steering motion of a vehicle steering wheel and provides a steering signal to the control unit. The control unit determines an acceleration signal for a lateral acceleration from the steering signal and a vehicle velocity.

A navigation system connection serves to transmit distance-covered data for a specified road course, the control unit being fashioned so as to determine an expected lateral acceleration with the aid of the distance-covered data and instantaneous vehicle motion data.

In a preferred embodiment, the adjustment of a bolster, as a seat section adjusting element, is effected with an integral, space-saving worm-gear spindle transmission. In this way the adjustment path can be implemented in space-saving fashion on a sliding/rolling key principle. Direct drive, with a correspondingly smaller installation volume, is thus possible. In addition, high adjusting forces and high adjusting speeds, which permit the use of an automatic control system in accordance with the circuit arrangement, are made possible.

What is fashioned is thus a compact drive unit that can be integrated into the commonly very restricted installation space of an automobile seat back with the motor, in particular a DC or stepping motor, directly flange-mounted or positioned remotely. In connection with a sensing unit based for example on a Hall effect sensor or a potentiometer, a comfort adjustment is enabled, the very short adjustment times allows adjustments related to driving dynamics to be carried out in real-time or almost in real-time. In particular, in connection with a navigation system and in correspondence with a possible advance calculation of expected driving maneuvers with laterally acting forces, adjustments related to driving dynamics can be accomplished to enhance comfort and driving safety.

With a view to compact, space-saving construction with only a few structural elements, economical implementation as well as quick, economical repair in case of damage is possible.

These and other objects, features and advantages of the present invention will become more apparent in light of the following detailed description of preferred embodiments thereof, as illustrated in the accompanying drawings.

DETAILED DESCRIPTION OF THE INVENTION

Figure 1:
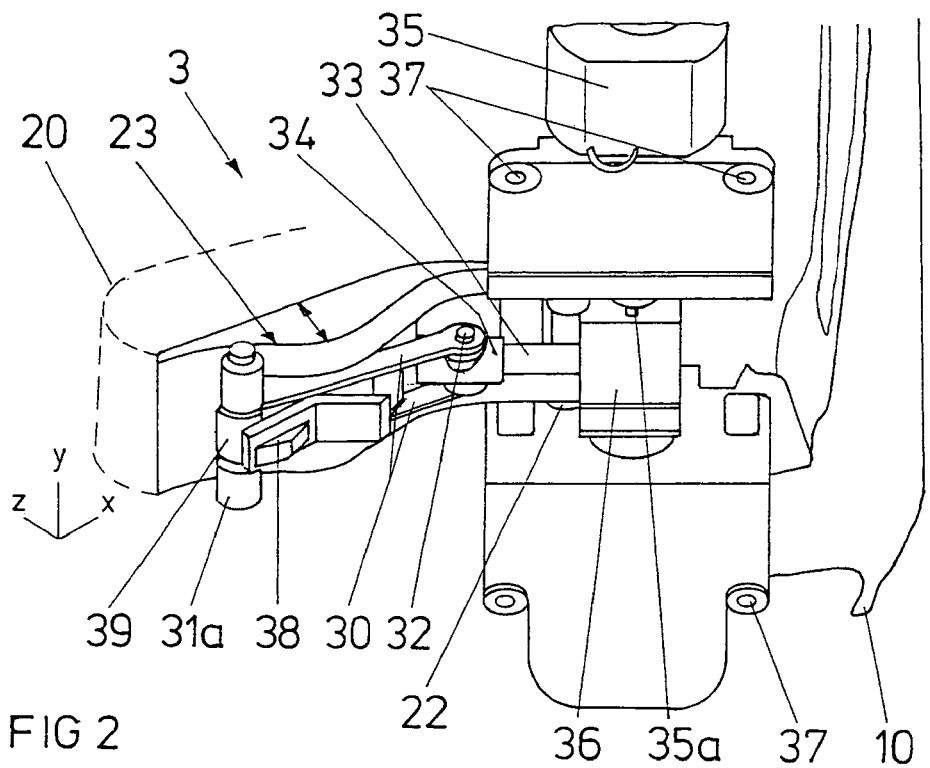
FIGS. 1 and 2 illustrate a first exemplary embodiment of a vehicle seat section adjusting device for adjusting a seat side bolster in two distinct perspective views.
Figure 2:
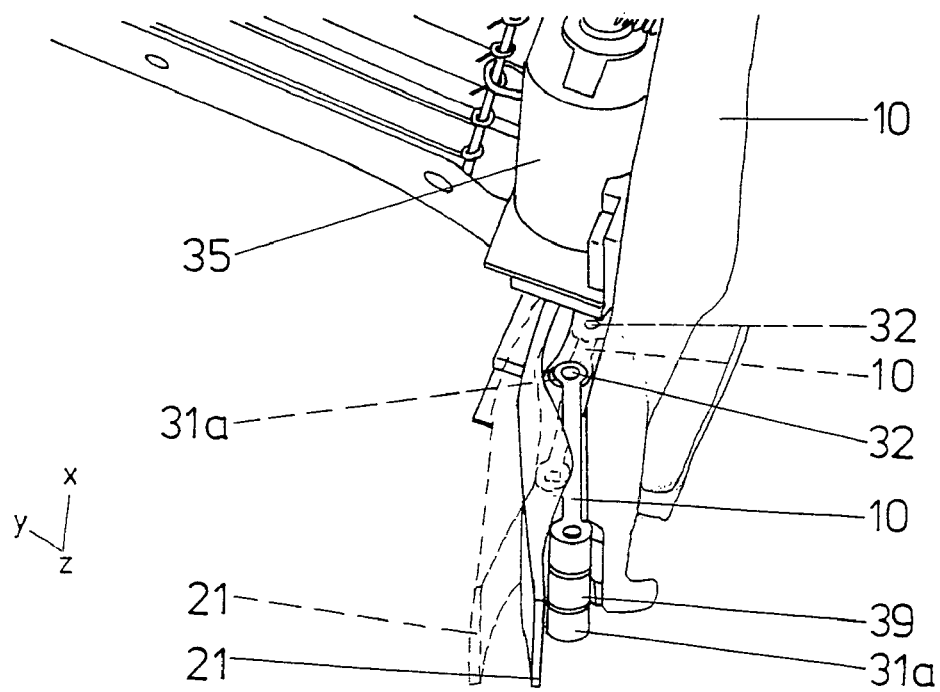

Referring to FIGS. 1 and 2, a vehicle seat section adjusting device 3 essentially comprises a spindle drive and a lever mechanism. A seat of a vehicle, in particular a motor vehicle, has a seat frame 10. The seat frame 10 carries the essential basic components of the seat and further serves to mount the seat on the vehicle. Basic elements of a seat include the seat surface proper, with lateral side bolsters as seat sections 21 of the seat surface, and the seat back for supporting a back, with lateral back elements as other seat sections. The vehicle seat section adjusting device adjusts the lateral back sections or side bolsters 21 of the seat surface to adapt the back width or the seat width to the needs of the person sitting on the seat. Further, with a corresponding automatic control, width adjustments of the side bolsters or back side sections can be effected depending on centrifugal forces acting laterally on the sitting person by broadening on the side directed opposite to the centrifugal force.

The side bolster and the lateral back sections of a seat usually comprise a seat cushion 20 covered by a seat cover. Serving for lateral adjustment of the seat cushion 20 is the seat section adjusting element 21 which, in the exemplary embodiment depicted, is rotatably supported on an adjusting element support 22. The adjusting element support 22 is directly or indirectly attached to the seat frame in a fixed position.

Serving to adjust seat section adjusting element 21 is an adjusting mechanism having a lever 30. One lever end element in the form of a pin or rollers 31a slides along an adjusting element abutment 23. In the first exemplary embodiment, the adjusting element abutment 23 is formed by the side of the seat section adjusting element 21 that is arranged opposite to the seat cushion 20. The adjusting element abutment 23 may be shaped in such a way that the seat section adjusting element 21 is pivoted about the adjusting element support 22 when a motion, in particular a linear motion, of the lever 30 or the rollers 31a along the adjusting element abutment 23 occurs. In this way, the seat section adjusting element 21 is pivoted in the direction toward the seat cushion 20 or in the opposite direction away therefrom. Optionally, for the reverse adjustment, a restoring spring can prestress the seat section adjusting element 21 into a base position opposite the force of the lever 30.

The shape of the adjusting element abutment 23, which is formed by the backside of the seat section adjusting element 21, is specified in that the seat section adjusting element 21 has a width b that varies over its length. While seat section adjusting element 21 is made narrow at the front (i.e., away from the adjusting element support 22), the width b in the next section increases in the direction of the adjusting element support 22. The adjusting element abutment 23 preferably has a concave contour as viewed from the standpoint of the lever 30. When the lever 30 or its rollers 31a slide along from the front end of the seat section adjusting element 21 in the direction of the adjusting element support 22 along a straight-line path, the seat section adjusting element 21 is correspondingly pushed in the direction of the seat cushion 20. The straight-line path is formed by a lever abutment or outrigger abutment 38, which is arranged in a fixed position relative to the adjusting element support 22.

A spindle drive 35 is supported in a fixed position relative to the seat frame 10 and drives the lever 30. The spindle drive 35 is attached, for example, directly to the seat frame 10 via adjusting mechanism mounting mechanism elements 37, for example bolts. The spindle drive 35 drives a drive shaft 35a, which drives a spindle 33 via worm-gear transmission 36. In this way, the spindle drive 35 can be arranged in space-saving fashion in the seat in a direction perpendicular to the spindle 33 and the other elements of the adjusting mechanism 3.

Sitting on the spindle 33, which for example is supported on the seat frame 10 on the spindle drive 35, is a spindle nut 34 that has a lever support or outrigger support 32 for the supporting lever 30. When the spindle 33 rotates, the spindle nut 34 moves on the spindle 33 in a forward or rearward direction. Correspondingly, the end of the lever 30 supported on the lever support 32 is moved forward and backward along the spindle 33. The other end of the lever 30, on which rollers 31a are supported as outriggers 31, is correspondingly moved forward and backward along the adjusting element abutment 23.

To exert a force on the adjusting element abutment 23, the lever 30 has on its front end, besides the rollers 31a, a lever abutment sliding element 39, which slides along the side of lever abutment 38 facing toward the adjusting element abutment 23.

In a preferred embodiment, the lever abutment 38 is supported at the front end of the spindle 33 in such fashion that it does not co-rotate when the spindle 33 rotates. The spindle 33 in turn is supported in the adjusting mechanism 3 and the worm-gear transmission 36 in such fashion that it forms a positionally fixed connection for the lever abutment 38 to the spindle drive 35 and thereby to the seat frame 10. The adjusting element support 22 for supporting the seat section adjusting element 21 is mounted on the worm-gear transmission 36 or directly on the spindle drive 35 and thereby on the seat frame 10.

In order to permit the most space-saving and linear alignment possible of all elements of the adjusting mechanism and of the seat section adjusting element 21, especially in the base position, the seat section adjusting element 21 has a central opening 25, which in the embodiment depicted is actually made as a through hole through the seat section adjusting element. The base position is depicted in FIG. 1 and also by the solid lines in FIG. 2. In the base position, the front end of the spindle 33, the end of the lever abutment 38 supported thereon, and a part of the lever 30 are accommodated in the adjusting element opening 25. In this position, the spindle nut 34 is located at the front end of the spindle 33.

When the spindle nut 34 moves toward the rear end of the spindle 33, the spindle nut 34 pulls the lever 30 via the lever support 32 and thus the rollers 31a, supported thereon at the front, in the rearward direction. The lever abutment sliding element 39 then slides over the lever abutment 38, which runs obliquely to the longitudinal direction of the spindle 33. The rollers 31a slide along the surface of the adjusting element abutment 23, the seat section adjusting element 21 and thus the seat cushion 20 being pushed in a direction away from the lever abutment 38 and from the spindle 33 in a substantially frontward direction. The corresponding end position is depicted by dashed lines in FIG. 2.

In the embodiment depicted, there is a symmetrical arrangement of a plurality of the elements cited in order to support a uniform force distribution and motion. Thus the spindle nut 34 has a lever 30 supported on either side thereof, the two levers 30 bracketing the lever abutment 38 in their further extension and accommodating between them, forward thereof, the lever abutment sliding element 39. The rollers 31a are arranged to either side of this front-end arrangement.

Figure 3:
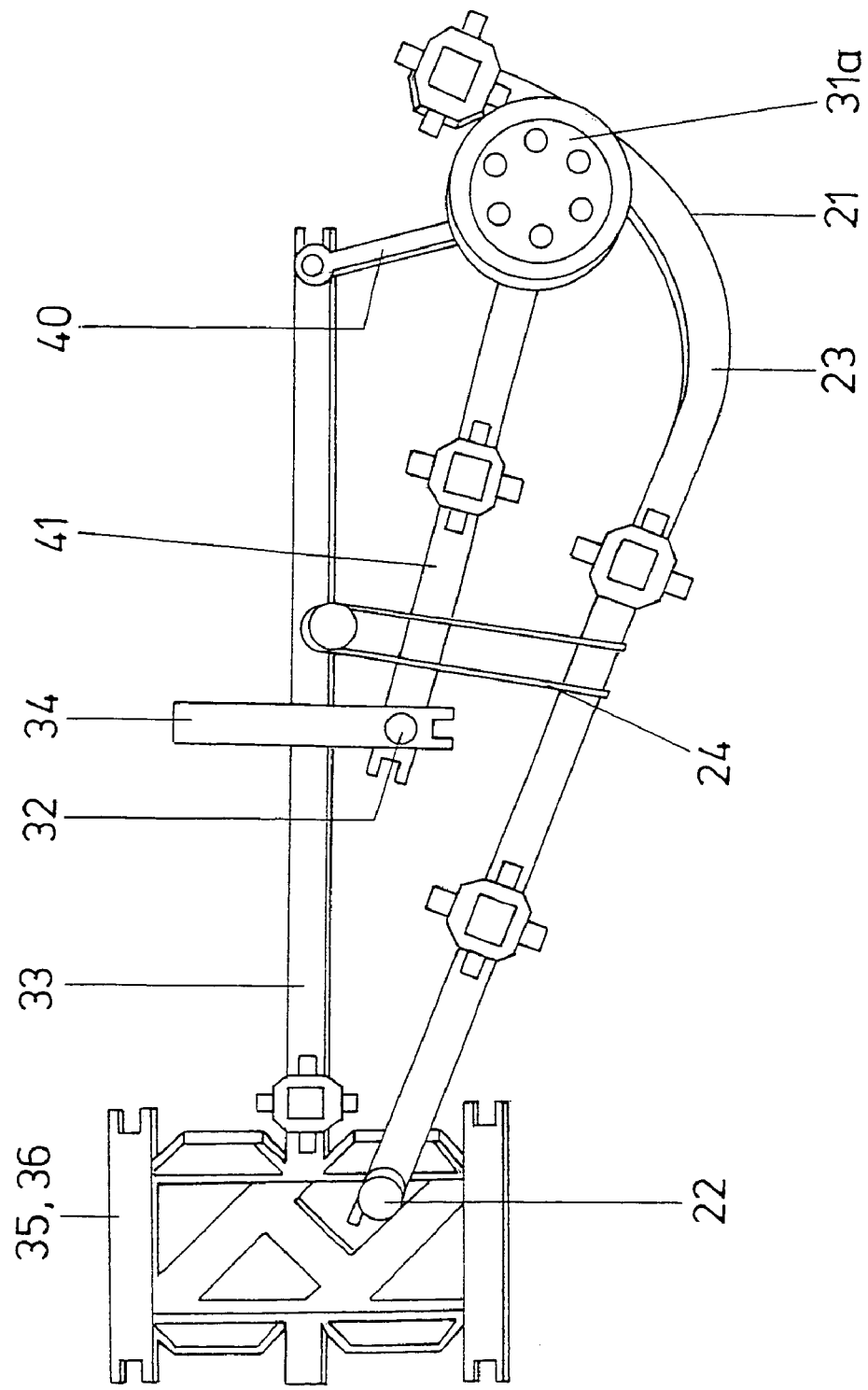
FIGS. 3 and 4 schematically illustrate a second exemplary embodiment of a vehicle seat section adjusting device.
Figure 4:
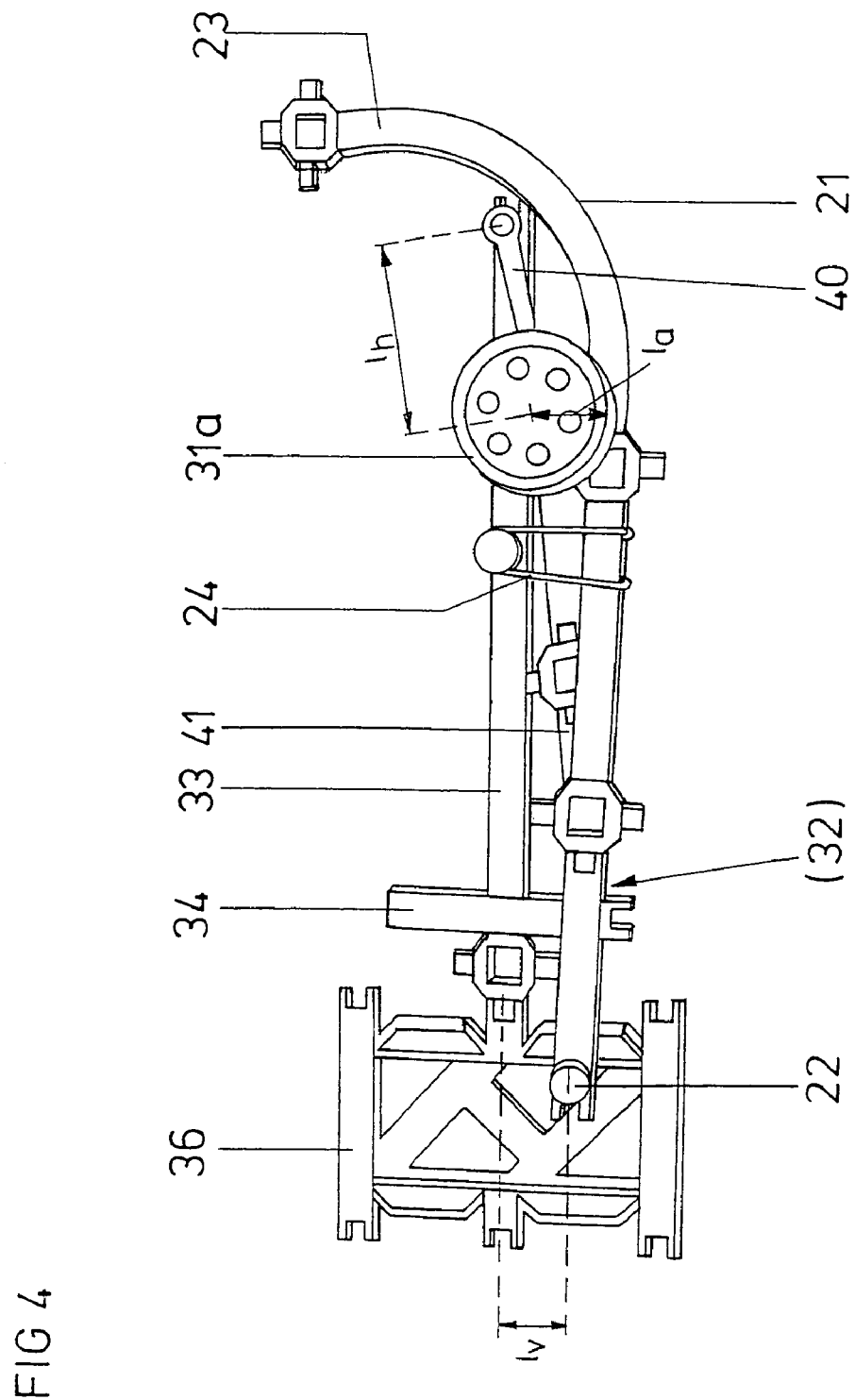

FIGS. 3 and 4 depict schematically a second embodiment with a view to the spatial arrangement of the individual components, in order to illustrate the functional principle. Functionally or structurally comparable structural elements are assigned the same reference characters as in the embodiment illustrated in FIGS. 1–2.

Through a worm-gear transmission 36, once again, there leads a spindle 33 on which a spindle nut 34 is moved forward or backward depending on the rotation direction of the spindle 33. On the spindle nut 34 there is arranged in turn a lever support 32 on which a lever 41 is supported at its rear end. An outrigger 31a, extending laterally in the direction of the seat section adjusting element 21, is mounted or supported on the lever 41 at the front end. In the embodiment depicted, the outrigger 31a is a roller. The seat section adjusting element 21 for adjusting a seat cushion is supported at its rear end via an adjusting element support 22 on the housing of the worm-gear transmission 36. Toward the front end, the seat section adjusting element 21 is concavely arc-shaped on its side facing away from the seat cushion and facing toward the lever 41 and the roller 31a.

In this embodiment, instead of a rigid lever abutment or outrigger abutment (38), there is at the front end of the spindle 33 a link, not co-rotating therewith, to the support of a guide rod 40. The other end of the guide rod 40 is supported at the front end of the lever 41, which is fashioned as a coupling rod. When the spindle nut and thus the lever 41 moves forward or rearward, the roller 31a thus moves not along a straight-line path but along a circular path about the support point at the front end of the spindle 33. Depending on the position of the roller 31a, the seat section adjusting element 21 is moved forward or rearward thereby in a direction lateral to the spindle 33.

The guide rod 40 can alternatively be also supported on a frame element that extends parallel to spindle 33 and, if appropriate, also supports the front end of the spindle 33 to brace it. In an alternative embodiment it is also possible, instead of a spindle drive perpendicular to the spindle 33 and a correspondingly required worm-gear transmission 36, to convert the rotation of the spindle drive to the spindle 33 by using a drive with the spindle 33 as a drive shaft or using a drive shaft running parallel to the spindle.

In the second embodiment depicted, the seat section adjusting element is prestressed in the direction of the spindle 33 or opposite the direction of the seat cushion to be adjusted, with the aid of an elastic element, for example a rubber cord or a spring 24 as the prestressing mechanism.

In this embodiment, as can be seen from FIG. 4, the use of lever forces is exploited to optimize the action. The guide rod 40 has a lever length $1_h$ with which the support point of the roller 31a is pivoted about the front end of the spindle 33. A further lever arm with an outrigger length $1_a$, which equals the radius of the roller 31a, acts laterally from the support point of the roller 31a. The use of the roller 31a instead of a rigid lateral outrigger means that this outrigger length $1_a$ acts independently of the position of the front end of the guide rod 40 or equally the position of the lever 30 relative to the contact point on the adjusting element abutment 23, i.e., the side of the seat section adjusting element 21 facing toward the roller 31a. Depending on the structural form, it is also advantageous to have, as the adjusting element support 22 for the seat section adjusting element 21, a support point offset laterally by an offset length $1_v$ relative to the longitudinal axis of the spindle 33.

Figure 5:
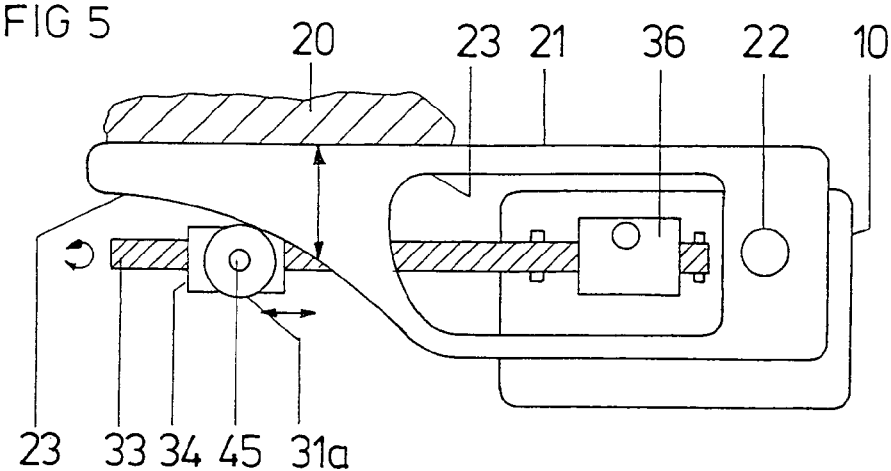
FIGS. 5 and 6 illustrate a third exemplary embodiment of a vehicle seat section adjusting device.
Figure 6:
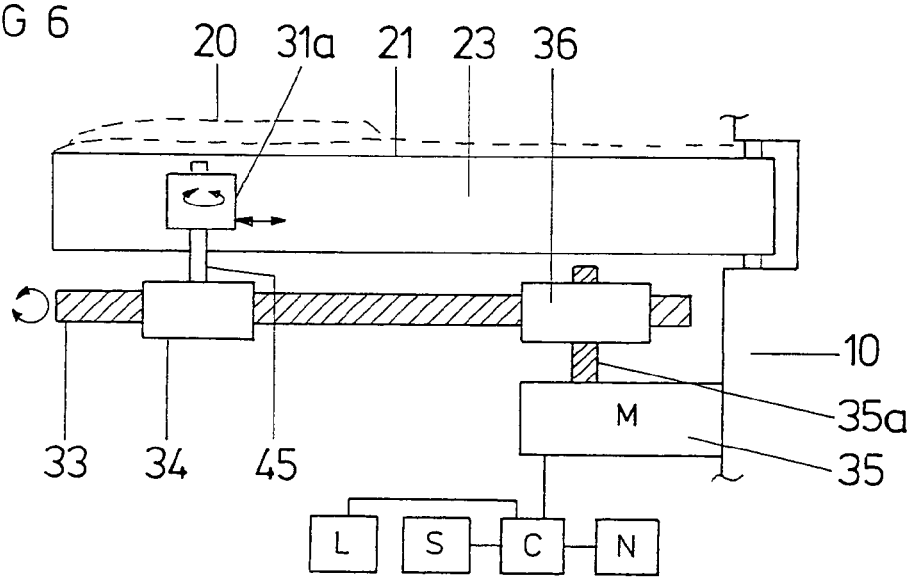

In the third embodiment of FIGS. 5 and 6, in contrast to the first two exemplary embodiments, no levers are adjusted by the spindle. As in the other exemplary embodiments, however, once again an outrigger element or a roller moved forward or rearward by a spindle slides along an adjusting element abutment of an adapted shape.

A seat section adjusting element 21 is pivotably supported via an adjusting element support 22 on the seat frame 10 or an adjusting device frame mounted on the seat frame 10. The seat section adjusting element 21 extends in substantially longitudinally shaped fashion from the adjusting element support 22, a seat cushion 20 to be adjusted being adjacent to or mounted on one longitudinal side. The opposite longitudinal side is fashioned as the adjusting element abutment 23 and has a width b that decreases toward the front as viewed from above. Preferably the shape is once again arc-shaped and concave, the shape being chosen depending on, among other things, the desired adjustment speed of the seat cushion 20. A spindle 33 driven by a spindle drive, via a worm-gear transmission 36 if appropriate, runs in turn parallel to the longitudinal extension of seat section adjusting element 21 in, for example, its base position. A spindle nut 34, which carries an outrigger 45 standing off laterally, is supported on the spindle 33. Either the outrigger 45 or, as depicted, a roller 31a supported thereon slides with its lateral circumference along the adjusting element abutment 23.

In this embodiment, the spindle 33 runs preferably above, below, or in a corresponding opening inside the seat section adjusting element 21, so that the outrigger 45 is aligned perpendicular to the longitudinal extension of the seat section adjusting element 21 when the spindle nut 34 moves forward or rearward and the circumference of the outrigger or the circumference of the roller 31a slides along the adjusting element abutment 23.

Figure 7:
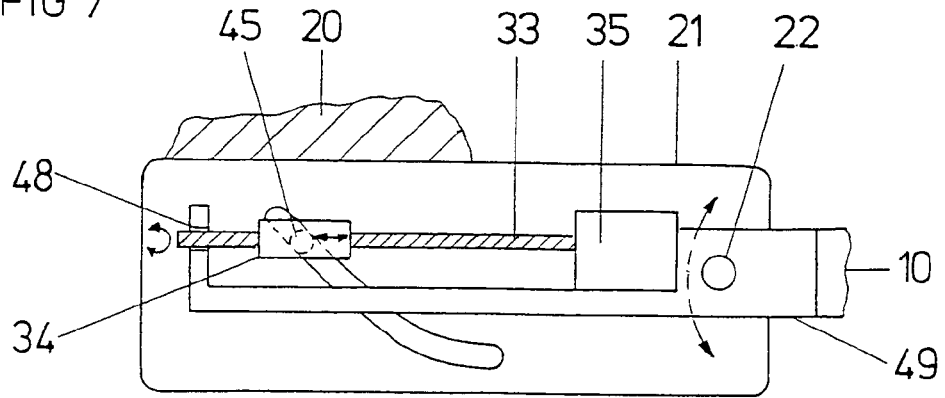
FIG. 7 illustrates a fourth exemplary embodiment of a vehicle seat section adjusting device.

In the embodiment depicted in FIG. 7, the structure is substantially similar to that of the third embodiment. A seat section adjusting element 21 is supported via an adjusting element support 22 on a seat section adjusting device frame 49. The seat section adjusting device frame 49 is directly or indirectly rigidly mounted on the seat frame. The seat section adjusting element 21 again extends in a longitudinal direction along a seat cushion 20 that is to be adjusted in a substantially lateral direction relative to the longitudinal direction of the seat section adjusting element 21.

Instead of an arc-shaped side wall as the adjusting element abutment, the seat section adjusting element 21 has in its flat surface an arc-shaped groove 46 as the adjusting element abutment.

Extending parallel to the surface of the seat section adjusting element 21 and a longitudinal direction that is identical with respect to one of its positions is a spindle 33 driven by a spindle drive 35. The spindle drive 35 is likewise mounted on the seat section adjusting device frame 49. Likewise, the front end of the spindle 33 is advantageously supported on the seat section adjusting device frame 49 via a spindle support 48 so that a lateral bending of the spindle 33 when a spindle nut 34 moves along the spindle 33 is avoided.

Sitting on the spindle nut 34 is again an outrigger 45, which extends in the direction of the seat section adjusting element 21 and engages with its front end into the groove 46. When the spindle nut 34 moves forward or rearward along the spindle 33, the outrigger 45 is moved inside the groove 46, so that the seat section adjusting element 21 is correspondingly pivoted about its adjusting element support 22 and the seat cushion 20 is thereby moved laterally.

While lever forces are not present in this embodiment, the construction is especially compact. Because of the groove 46, which limits the outrigger 45 on both sides, the seat section adjusting element 21 is actively moved not in just one direction but also in the reverse direction when the outrigger 45 moves; that is, it is pivoted in both directions about the adjusting element support 22, so that a restoring spring can be dispensed with.

Together with the possible variations of the basic concept of a seat section adjusting device depicted by the several embodiments, further combinations of the individual elements of the several embodiments or further additions and modifications are possible. For example, a further element can be inserted between the seat section adjusting element and the seat cushion 20. Instead of a restoring spring, a cushion cover can also be used, which cushion cover is elastic and thus returns the seat cushion to a base position upon a reverse movement of the seat section adjusting element.

As can be seen from FIG. 6, spindle drive 35 is preferably an electric motor drive that is controlled by a control unit C. The control unit C is coupled to an acceleration sensor S for determining an instantaneously acting and/or an expected acceleration in the lateral direction of the seat. This enables control unit C to control the spindle drive 35 in such a way that the seat section adjusting element 21 momentarily increases the width of the seat section to be adjusted on the side of the seat opposite the direction of the acceleration. A side bolster and/or a backrest side section of the seat are thus enlarged on the seat side toward which a centrifugal force acts on the person sitting in the seat, in order to increase the seat stability for the person when driving on curves.

The acceleration sensor S can be an accelerometer for sensing a lateral acceleration and outputting an acceleration signal to the control unit C. Alternatively or additionally, the acceleration sensor S can also be a steering motion sensing unit L for sensing a steering motion of a vehicle steering wheel and outputting a steering signal to the control unit C. In this case, the control unit C is fashioned or programmed for determining an acceleration signal for a lateral acceleration from the steering signal and an instantaneous vehicle motion, in particular vehicle speed.

A navigation system connection for connecting a navigation system N to the control unit C is also especially advantageous. Distance-covered data for a specified road course are transmitted from the navigation system N, the control unit C being fashioned and programmed for determining an expected lateral acceleration with the aid of the distance-covered data and data of an instantaneous vehicle motion, that is in particular the vehicle speed. This makes possible not only a subsequent reaction of the control unit to already beginning lateral accelerations but actually permits a precalculation and thus real-time or anticipatory adjustment of the seat section width for a corresponding lateral acceleration.

Although the present invention has been shown and described with respect to several preferred embodiments thereof, various changes, omissions and additions to the form and detail thereof, may be made therein, without departing from the spirit and scope of the invention.

What is claimed is:

1. An apparatus for controlling a drive for a vehicle seat section adjusting device, comprising:
    a seat section adjusting element for adjusting a width of a seat section of a seat in an adjustment direction,
    a mounting mechanism for movably supporting the seat section adjusting element on the seat,
    a drivable adjusting mechanism for adjusting the seat section adjusting element relative to the mounting mechanism,
    an electric motor drive for driving the adjusting mechanism,
    an acceleration sensor for determining acceleration in the lateral direction of the seat, and
    a control unit for controlling the drive in such fashion that the seat section adjusting element momentarily enlarges the width of the seat section on the side of the seat that is directed opposite to the acceleration direction.

2. The apparatus of claim 1, comprising an abutment surface that includes a space between a pivot support of the seat section adjusting element and its support on the mounting mechanism.

3. The apparatus of claim 1, wherein the drivable adjusting mechanism comprises a lever element with an outer section, the outer section being fashioned for motion in contact with an abutment surface.

4. The apparatus of claim 3 wherein the seat section adjusting element and the lever element are supported spaced apart from one another and are arranged pivotably about their support points relative to a common plane.

5. The apparatus of claim 1 comprising a hole or recess in a wall of the seat section adjusting element in order to accommodate individual element sections of the apparatus in at least a base reference position.

6. The apparatus of claim 1, wherein said acceleration sensor comprises an accelerometer for sensing a lateral acceleration and providing an acceleration signal to the control unit.

7. The apparatus of claim 1 comprising a steering motion sensing unit for sensing a steering motion of a vehicle steering wheel and outputting a steering signal to the control unit.

8. The apparatus of claim 1 comprising a navigation system connection for transmitting distance-covered data for a specified road course, where the control unit determines an expected lateral acceleration in response to the distance-covered data and vehicle motion data.

* * * * *

UNITED STATES PATENT AND TRADEMARK OFFICE
CERTIFICATE OF CORRECTION

PATENT NO. : 7,131,695 B2 Page 1 of 1
APPLICATION NO. : 10/885485
DATED : November 7, 2006
INVENTOR(S) : Hofschulte et al.

It is certified that error appears in the above-identified patent and that said Letters Patent is hereby corrected as shown below:

Column 6
line 29, delete "$1h$" and insert --$l_h$--
line 31, delete "$1_a$" and insert --$l_a$--
line 34, delete "$1_a$" and insert --$l_a$--
line 42, delete "$1_v$" and insert --$l_v$--

Signed and Sealed this

Ninth Day of January, 2007

JON W. DUDAS
*Director of the United States Patent and Trademark Office*

UNITED STATES PATENT AND TRADEMARK OFFICE
CERTIFICATE OF CORRECTION

PATENT NO. : 7,131,695 B2 Page 1 of 1
APPLICATION NO. : 10/885485
DATED : November 7, 2006
INVENTOR(S) : Hofschulte et al.

It is certified that error appears in the above-identified patent and that said Letters Patent is hereby corrected as shown below:

Column 1
line 7, delete "devices" and insert --device--

Signed and Sealed this

Twenty-seventh Day of February, 2007

JON W. DUDAS
*Director of the United States Patent and Trademark Office*